US012762235B2

(12) United States Patent
Kelly et al.

(10) Patent No.: US 12,762,235 B2
(45) **Date of Patent: *Oct. 13, 2026**

(54) TECHNIQUES FOR TRACKING EXECUTABLE IMAGES ACROSS FORKING OPERATIONS

(71) Applicant: CrowdStrike, Inc., Sunnyvale, CA (US)

(72) Inventors: Martin Kelly, Bothell, WA (US); Jayasankar Divakarla, Bangalore (IN)

(73) Assignee: CrowdStrike, Inc., Sunnyvale, CA (US)

( * ) Notice: Subject to any disclaimer, the term of this patent is extended or adjusted under 35 U.S.C. 154(b) by 576 days.

This patent is subject to a terminal disclaimer.

(21) Appl. No.: 18/085,088

(22) Filed: Dec. 20, 2022

(65) Prior Publication Data

US 2024/0202337 A1 Jun. 20, 2024

(51) Int. Cl.

*G06F 21/51* (2013.01)
*G06F 21/52* (2013.01)
*G06F 21/56* (2013.01)

(52) U.S. Cl.

CPC ............ *G06F 21/566* (2013.01); *G06F 21/52* (2013.01); *G06F 2221/034* (2013.01)

(58) Field of Classification Search

CPC ... G06F 21/566; G06F 21/52; G06F 2221/034
USPC .......................................................... 726/23
See application file for complete search history.

(56) References Cited

U.S. PATENT DOCUMENTS

2014/0137184 A1* 5/2014 Russello ................. H04L 63/20 726/1
2018/0189339 A1* 7/2018 Ananthakrishnan ......................... G06F 11/3006
2018/0189490 A1* 7/2018 Maciejak .............. G06F 21/566
2022/0253524 A1* 8/2022 Gadient .............. G06F 11/1469
2023/0136586 A1* 5/2023 Kumar .................. G06F 21/566 726/23
2023/0412616 A1* 12/2023 Goldstein ........... H04L 63/1416
2023/0421587 A1* 12/2023 Meyer ................. H04L 63/1425

FOREIGN PATENT DOCUMENTS

BR 112020019153 B1 * 5/2022 .......... G06F 11/3006

OTHER PUBLICATIONS

Marcus Brandenburger; Rollback and Forking Detection for Trusted Execution Environments using Lightweight Collective Memory; ArXiv; year:2017; pp. 1-23.*

* cited by examiner

*Primary Examiner* — Monjur Rahim
(74) *Attorney, Agent, or Firm* — Womble Bond Dickinson (US) LLP

(57) ABSTRACT

A creation of a first process is detected in a kernel space of the operating system executing on a computing device. An exec parent of the first process is determined. The exec parent identifies a second process within an ancestry of the first process that last performed an exec operation prior to the creation of the first process. A unique process identifier (UPID) associated with a process identifier (PID) of the first process is generated. The UPID is associated with the exec parent in a first mapping store that maps the PID to the UPID. Process activity of the first process executing in the operating system is tracked to generate process activity data that comprises the exec parent.

20 Claims, 8 Drawing Sheets

TECHNIQUES FOR TRACKING EXECUTABLE IMAGES ACROSS FORKING OPERATIONS

TECHNICAL FIELD

Aspects of the present disclosure relate to tracking process activity in an operating system, and more particularly, to tracking process activity in operating systems supporting process forking.

BACKGROUND

Many modern operating systems are separated into a user space and a kernel space. The kernel space is typically more privileged, and may execute operations with an administrative privilege level that is protected from general access. One way to extend the functionality of an operating system (OS) may include the use of kernel drivers. Kernel modules may be separate modules which may be loaded into the operating system and executed with the administrative privilege level of the kernel within a structured framework. Kernel modules offer a way for those wishing to extend the functionality of the OS, such as hardware providers, to execute privileged operations.

In some scenarios, it may be beneficial to allow for execution of privileged operations through a more dynamic and/or secure interface than kernel drivers. One such mechanism is the extended Berkeley packet filter (eBPF). Infrastructure such as eBPF allows applications executing in user space to provide operational logic to be executed within the kernel space of the operating system. Such access, however, may be limited in functionality to increase security. For example, environments such as eBPF may limit the types of access and/or instructions that may be executed within the kernel space, which may limit the types of operations that may be performed in such environments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
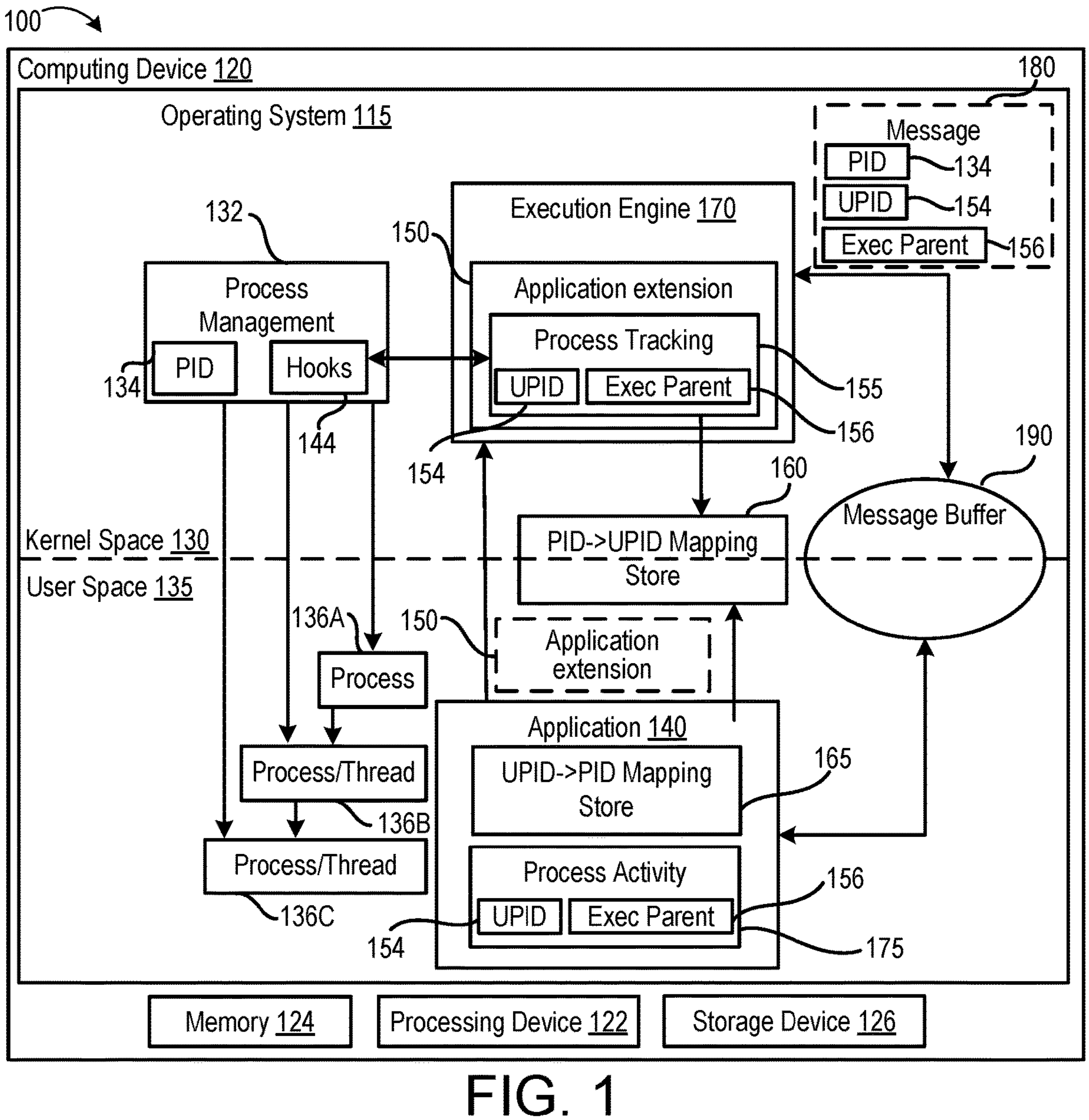
FIG. 1 is a block diagram that illustrates an example system, according to some embodiments of the present disclosure.

In infrastructures such as eBPF, where code is provided into the kernel space of the OS to execute, several security features may be present. For example, verification operations may be performed on the code that is to be run in the kernel space to confirm that the code will not expose vulnerabilities that may be exploited to access the kernel. In addition, the code that is to be run in the kernel space may be limited in the types of access it is allowed. For example, the code that is to be run in the kernel space may be denied access to certain functionality. Instead, the code that is to be run in the kernel may be limited to access of functions that are less likely to represent a risk to the kernel space. As an example, code provided to eBPF may be unable to access certain locks or may only have access to atomic operation (e.g., atomic increment/decrement) that do not return an incremented/decremented value from the atomic operation.

In some cases, it may be useful for the code that is being run in the kernel to be able to uniquely track processes being executed. For example, security architectures may track behavior and/or transactions performed by a process to determine if they are malicious. In some cases, the ability to track a process may extend beyond the life of the process. For example, if a security problem is detected, it may be useful to be able to track prior-executed processes to determine if they contributed to, or are affected by, the security problem.

An operating system may generate a process identifier (ID), also referred to as a PID, for each process created. A given process may spawn additional processes, each having a different PID. In operating systems supporting aspects of the Portable Operating System Interface (POSIX) standard, spawning a new process may follow a sequence of events that can make tracking process activity difficult. For example, spawning a new process may include first performing an operation typically called a fork, which creates a child process as a copy of the parent process, including the instruction codes and memory space. In an operation implementing the fork process as a fork system call, the child process may return from the system call in the same manner as the parent process (e.g., within the copy of the parent instruction codes), and may continue executing from that point.

While the child process may continue to execute in this manner, the child process may replace the instruction codes of the parent with a new set of instruction codes. As an example from a POSIX-compliant operating system, this process may include a system call often known as an exec. As used herein, an exec operation refers to a function in an operating system, and/or provided by a system call that interfaces with the operating system, that operates to replace the instruction space of a process with a new set of instruction codes. An example of an exec operation in the LINUX operating system is an operation performed by the kernel in response to a system call (e.g., execve( )). Thus, in a POSIX-compliant operating system (though not limited to POSIX-compliant operating system), a parent process that wishes to spawn a different program/application, will first perform a fork, and then the child process may perform an exec of the different program/application.

The use of the fork/exec sequence may make it complex to track process activity. For example, for the purposes of process tracking, it may be useful to know which programs/applications spawn new programs/applications. However, such knowledge may not necessarily correspond to the actual processes of the operating system. For example, a process may fork multiple children processes, which may subsequently fork multiple processes. However, until an exec is performed, each of those processes represents a same application/program. From a tracking perspective, these multiple processes may be less interesting, as they, as a group, represent a same executable image. In contrast, a same process that performs multiple execs represents a process that is exchanging its set of instruction codes multiple times, despite being a single process. This activity may be of interest with respect to process activity tracking, despite representing only a single process. As a result, the process tree that may be available from an operating system perspective, may hide the types of information that may be useful for security tracking of processes.

The present disclosure addresses the above-noted and other deficiencies by providing a technique for tracking the process of swapping execution instructions (e.g., instances of an exec operation) across the processes of an operating system. In some embodiments, for every process that is created, its exec parent may be tracked. As used herein, an exec parent may refer to a particular ancestor process, within the ancestry of a given process, that was the last ancestor process of the given process to perform an exec function. The ancestry of a process may refer to the parent of a child process (e.g., the parent process that performed a fork operation to spawn the child process) as well as the parent of the parent process, the parent of the parent of the parent process, and so on. As will be described further herein, the exec parent for a given process may be different than the parent process for the given process.

The embodiments described herein provide improvements over some process tracking techniques utilized in infrastructures similar to eBPF. The techniques described herein provide for the generation of mappings between processes (as well as other tracking metrics) and their associated exec parents, that may be shared between the kernel space and user space of the operating system. This may allow for more sophisticated tracking options that may accommodate that implementations of process generation operations that are often used in certain operation systems, such as LINUX and/or POSIX-compliant operating systems. Embodiments according to the present disclosure may provide a technological improvement that improves the operation of a computing device by allowing for the tracking of process creation for long-term analysis despite the complexities associated with process creation that can be present in many operating systems.

For example, embodiments according to the present disclosure may focus process tracking, as well as process ancestry tracking, on operations that replace the instruction codes of the process (e.g., exec functions). This may reduce resources (e.g., process and/or storage resources) spent on tracking processes created by forking operations in which a same executable image is copied. By avoiding the use of additional resources to track forking scenarios that do not ultimately perform an exec operation, a few significant advantages may be achieved. First, a message volume may be reduced by roughly fifty percent in typical workloads, since many fork operations may immediately be followed by an exec operation. Thus, tracking both a fork operation and an exec operation may result in two tracking messages for a fork operation that is ultimately followed by an exec operation, while tracking only exec operations results in a single message for the same scenario. In addition, by tracking according to exec operations, embodiments according to the present disclosure may generate an exec process tree that is based on executable images instead of the operating system parent. This may highlight process relationships based on the underlying instruction codes, which may make it easier to write reliable detections in a security context. Moreover, as will be described further herein, embodiments of the present disclosure may allow for exec-level tracking in a way that avoids the use of locks or reference counting, which may utilize fully-functional atomic operations. Embodiments of the present disclosure may still be able to operate in scenarios such as those used in eBPF in which the embodiments are executing in restricted environments of the kernel of an operating system.

FIG. 1 is a block diagram that illustrates an example system 100, according to some embodiments of the present disclosure. FIG. 1 and the other figures may use like reference numerals to identify like elements. Thus, the same or similar numbers may be described with reference to other drawings even if they are neither mentioned nor described in the corresponding drawing. Also, elements that are not denoted by reference numbers may be described with reference to other drawings. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

In some embodiments, memory 124 may be non-uniform access (NUMA), such that memory access time depends on the memory location relative to processing device 122. It should be noted that although, for simplicity, a single processing device 122 is depicted in the computing device 120 depicted in FIG. 1, other embodiments of the computing device 120 may include multiple processing devices, storage devices, or other devices.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

The storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In some embodiments, the storage device 126 may be used to store computer instructions which may implement one or more operations described herein. For example, the storage device 126 may store the computer instructions, which may be loaded into memory 124 and executed by the processing device 122.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may execute an operating system 115. The operating system 115 of computing device 120 may manage the execution of other components (e.g., software, applications, etc.) and/or may manage access to the hardware (e.g., processing device(s) 122, memory 124, and/or storage devices 126, etc.) of the computing device 120. Operating system 115 may be software to provide an interface between the computing hardware (e.g., processing device 122 and/or storage device 126) and applications running on the operating system 115. Operating system 115 may include a kernel space 130 and a user space 135 supporting the execution of one or more applications 140. Though only a single application 140 is illustrated in FIG. 1, it will be understood that a plurality of applications 140 may be present. Operating system kernel space 130 may include several operating system functionalities, including but not limited to process management, hardware interfaces, access control and the like. Functions executing within the kernel space 130 may execute with an elevated privilege and may manage the administration of the operating system 115. Examples of operating systems 115 include WINDOWS™, LINUX™, ANDROID™, IOS™, and MACOS™.

As illustrated in FIG. 1, computing device 120 may execute (e.g., using processing device 122) an application 140. Application 140 may be a desktop application, a network application, a security application, a database application, or any other application that may be executed by the operating system 115. Portions of an application 140 executing within the user space 135 may execute with a reduced privilege as compared to the kernel space 130, and may be required to utilize standardized application programming interfaces (APIs), such as system calls, to access the functionality of the kernel space 130 of the operating system 115. In some embodiments, the application 140 may include functionality represented by an application extension 150 that is to be executed in the kernel space 130. The application extension 150 may be or include executable instructions that are provided by the application 140 to the kernel space 130 via an API, to be executed within the kernel space 130 utilizing the administrative privileges and/or access of the kernel space 130.

The application 140 may provide the application extension 150 to execution engine 170 within the kernel space 130. In some embodiments, the application extension 150 may be or include bytecode, though the embodiments of the present disclosure are not limited to such a configuration. In some embodiments, bytecode includes object code that may be converted to machine code (e.g., binary instructions compatible with processing device 122) by the execution engine 170.

The execution engine 170 may execute the application extension 150 within the context of the kernel space 130. For example, the execution engine 170 may execute the application extension 150 with the administrative privileges and access of the kernel space 130. This may allow the application extension 150 to perform privileged operations not available to the application 140 executing in user space 135.

To assist in security of the operating system 115, the application extension 150 may be subject to certain limitations during its execution. For example, the application extension 150 may not have full access to all of the APIs available to other portions of the kernel space 130. In some embodiments, the application extension 150 may not have access to fully-functional atomic operations, software locks, and/or hardware randomization devices.

In some embodiments, while executing, the application extension 150 may exchange one or more messages 180 with application 140. In some embodiments, the message 180 may be exchanged utilizing a message buffer 190. The application extension 150 may send message 180 into message buffer 190 for storage and the message 180 may be retrieved by the application 140. In some embodiments, the message 180 may be stored in memory (e.g., memory 124) allocated for the message buffer 190. In some embodiments, the message buffer 190 may be a ring buffer. A ring buffer includes data structures that utilize a linear buffer in memory that is accessed as if it were connected end-to-end (e.g., circularly). In some embodiments, a ring buffer may be accessed in a first-in-first-out (FIFO) manner.

The use of the message buffer 190 may allow the application extension 150 to exchange data and/or other message payloads with the application 140 using the messages 180. For example, the application extension 150 may perform a monitoring function that is capable of analyzing processes 136 that are created within the privileged kernel space 130. The application extension 150 may be able to detect the creation of a process 136 and inform the application 140 of the creation by using message 180.

A process management engine 132 may execute within the kernel space 130 of the operating system 115. The process management engine 132 may be a portion of the operating system 115 responsible for creating, destroying, and/or tracking processes 136 executing on the computing device 120. Processes 136 may be structures that facilitate the operation of executable code within the user space 135. Though not expressly illustrated in FIG. 1, application 140 may execute within a process 136.

When a request is made to generate a new process 136, the process management engine 132 may create the process 136 and generate a process ID (PID) 134 that is to be associated with the process 136. In some embodiments, three processes 136 are illustrated in FIG. 1 for ease of discussion. For example, a first process 136A, a second process 136B, and a third process 136C are illustrated in FIG. 1, but this is only an example and is not intended to limit the embodiments of the present disclosure.

In some embodiments, the PID 134 generated by the process management engine 132 may be a PID 134 that has been previously used for another process 136 that has since been destroyed. For example, the process management engine 132 may maintain uniqueness for PIDs 134 for the currently executing processes 136 of the operating system 115, but once a process 136 exits and/or is destroyed, the PID 134 for that process may be reused. To overcome this problem, a unique process identifier 154, also referred to as a UPID 154, may be generated to be associated with the process ID 134. For example, a 64-bit value may be generated for each created process 136, which may accommodate up to (2^64−1) or (2^(64−n)−1) (if n bits are reserved, e.g., n=1) PIDs 134. For those processes 136 which are to be tracked, a new UPID 154 may be created that is mapped to the PID 134 of the new process 136. Security tracking may utilize the UPID 154 for tracking the process 136 rather than the PID 134 so that the tracking may not be impacted by any potential reuse of PIDs 134. In some embodiments, the UPID 154 may be a numeric value. In some embodiments the UPID 154 may be a 64-bit value.

As used herein, a UPID 154 may refer to a value (a UPID) that can be associated with a process 136 and/or a PID 134 and is sufficiently unique so as to uniquely identify that process 136 and/or PID 134 for a reasonable timeframe. For example, though a unique PID 154 may eventually be reused, a unique PID 154 may not be reused over a reasonable timeframe over which the unique PIDs 154 are to be analyzed. As a non-limiting example, the timeframe may be three months or more, six month or more, or a year or more, depending on the underlying functionality being supported. This type of uniqueness may also be referred to as a pseudo-unique value and/or a probabilistically unique value. A UPID 154 of a size described herein may still be exposed to reuse (e.g., a value that wraps) given a long enough time of operation. However, as used herein, the term "unique" is not to imply a limitation to only those embodiments in which a value is strictly unique over an infinite timespan. Stated another way, the use of the term "unique" used within the specification and the claims is not intended to limit interpretations of the embodiments to values which are strictly unique (i.e., incapable of being reused over an infinite timespan). In some embodiments, uniqueness of a UPID 154 is defined with respect to a particular computing device 120. For example, a given UPID value may be used to represent different processes 136 on different computing devices 120.

In order to track the processes 136 effectively, it may be useful to detect the creation of the processes 136 in-line (e.g., at the moment of, or near in time to the moment of) the creation of the process 136. Thus, the application extension 150 executing within the execution engine 170 within the kernel space 130 may be able to detect the creation of the process 136 more effectively than code running in the user space 135. In order to generate a pseudo-unique UPID 154 to associate with a given process 136 that may be unique over a longer period of time, the application extension 150 may include a process tracking engine 155 configured to generate a UPID 154 for each process 136 created by the process management engine 132 that the process tracking engine 155 wishes to track. As part of generating the UPID 154, the process tracking engine 155 may maintain a process ID to unique ID (PID-to-UPID) mapping store 160.

In addition to the UPID 154, the process tracking engine 155 may also generate an exec parent 156 for a given process 136 when the creation of the process 136 is detected. As described herein, the exec parent 156 associated with a given process 136 may indicate a process 136 that last performed an exec operation within the ancestry of the given process 136. The use of the exec parent 156 may assist in tracking an exec relationship between a plurality of processes 136 of the operating system 115.

Figure 2A:
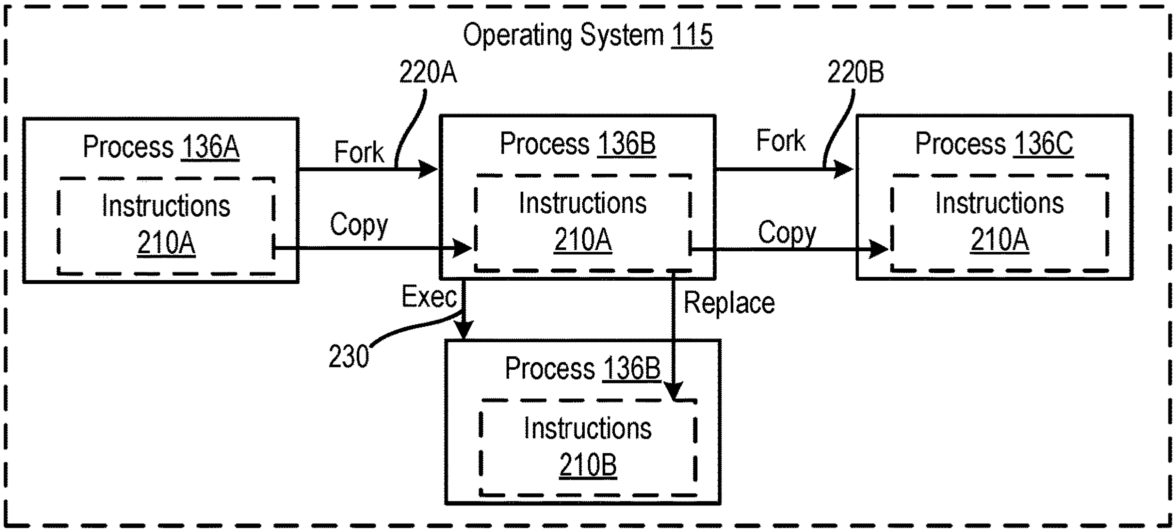
FIG. 2A is a block diagram illustrating an example of the creation of a plurality of processes, in accordance with some embodiments of the present disclosure.

As described herein, the creation of a process 136 (e.g., by process management engine 132) may be separated in some operating systems 115 from the loading of new instruction codes (e.g., an executable image) within the process 136. FIG. 2A is a block diagram illustrating an example of the creation of a plurality of processes 136, in accordance with some embodiments of the present disclosure. FIG. 2A is an example only, and is not intended to limit the embodiments of the present disclosure. A description of those elements of FIG. 2A that have been previously described will be omitted for brevity.

Referring to both FIGS. 1 and 2A, a first process 136A may be generated within operating system 115. For the purposes of explanation, it is assumed that the first process 136A was created at some point during the operation of the operating system 115. The first process 136A may include first instructions (also referred to computer instructions and/or instruction codes) 210A. The first instructions 210A may represent computer instruction codes 210A loaded, for example, into memory 124 from storage device 126. The first instructions 210A may represent the computer instructions that are executed by the processing device 122 to perform the operations of the first process 136A.

In some embodiments, the first process 136A may perform a first fork operation 220A. The first fork operation 220A may generate a second process 136B. As part of the generation of the second process 136B, the first instructions 210A of the first process 136A may be copied to the second process 136B so that the second process 136B also contains the first instructions 210A. Though described as a copy, it will be understood that this may not mean that a separate physical copy operation is necessarily performed. In some embodiments, the copy operation may be a copy-on-write operation in which the second process 136B contains a pointer to the first instructions 210A.

In some embodiments, the second process 136B may perform a second fork operation 220B. The second fork operation 220B may generate a third process 136C. As part of the generation of the third process 136C, the first instructions 210A of the second process 136B may be again copied to the third process 136C so that the third process 136C also contains the first instructions 210A. Thus, though three processes 136 exist at this point, a same copy of the first instructions 210A is utilized by each of the first through third processes 136A, 136B, 136C.

Next, the second process 136B may perform an exec operation 230 after performing the second fork operation 220B. As part of the exec operation 230, the first instructions 210A of the second process 136B may be replaced by second instructions 210B. The replacement of the first instructions 210A with the second instructions 210B may result in the second process 136B executing a different application/executable from the first process 136A and the third process 136C. Thus, the first and third processes 136A, 136C may be executing a same set of first instructions 210A, while the second process 136B is executing a different set of second instructions 210B after the exec operation 230. From the perspective of the operating system 115, the first process 136A is the parent of the second process 136B, and the second process in the parent of the third process 136C.

Figure 2B:
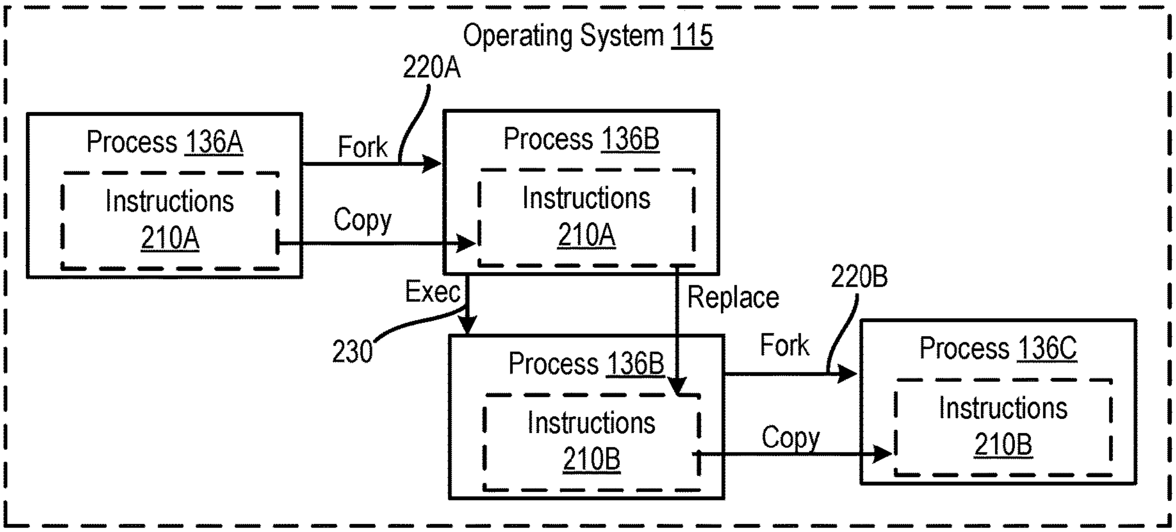
FIG. 2B is a block diagram illustrating an example of the creation of a plurality of processes with different timing from that of FIG. 2A, in accordance with some embodiments of the present disclosure.

FIG. 2B is a block diagram illustrating an example of the creation of a plurality of processes 136 with different timing from that of FIG. 2A, in accordance with some embodiments of the present disclosure. FIG. 2B is an example only, and is not intended to limit the embodiments of the present disclosure. A description of those elements of FIG. 2B that have been previously described will be omitted for brevity.

In FIG. 2B, an initial sequence of events is similar to those in FIG. 2A. Namely, a first process 136A performs a first fork operation 220A to generate a second process 136B having the same first instructions 210A as the first process 136A. However, the example of FIG. 2B illustrates the result when the exec operation 230 is performed before the second fork operation 220B.

As illustrated in FIG. 2B, the exec operation 230 performed by the second process 136B replaces the first instructions 210A with the second instructions 210B. The replacement of the first instructions 210A with the second instructions 210B may result in the second process 136B executing a different application/executable from the first process 136A.

After the exec operation 230, the second process 136B may perform a second fork operation 220B. The second fork operation 220B may generate a third process 136C. As part of the generation of the third process 136C, the second instructions 210B of the second process 136B (as a result of the exec operation 230) may be copied to the third process 136C so that the third process 136C also contains the second instructions 210B. At this point, the second and third processes 136B, 136C are executing a same set of second instructions 210B while the first process 136A is executing a different set of first instructions 210A.

Though the configuration of the instructions 210 within the first through third processes 136A, 136B, 136A in FIG. 2B is different than that of the example of FIG. 2A, the parentage within the operating system 115 has not changed. In other words, from the perspective of the operating system 115 for the configuration of FIG. 2B, the first process 136A is the parent of the second process 136B, and the second process in the parent of the third process 136C.

FIGS. 2A and 2B illustrate that the timing of a fork operation with respect to an exec operation may result in varying configurations of instruction codes 210 within a resulting set of processes 136, while the parentage of the processes 136 as seen by the operating system 115 does not change. As a result, the parent-child relationship of processes 136 within the operating system 115 may not be sufficient to determine the configuration of instructions 210 within the processes 136.

Referring back to FIG. 1, the process tracking engine 155 within the application extension may be configured to associate an exec parent 156 with each process 136 and/or UPID 154 to reflect the various types of exec relationships that can exist between processes 136 such as those illustrated in the examples of FIGS. 2A and 2B.

For a given process 136 in the process tree of the operating system 115, the exec parent 156 may refer to the process 136 next higher up in the process tree that last performed an exec operation. For example, if a second process 136B has an OS parent of a first process 136A, and if the first process 136A performed an exec operation, then the second process 136B has exec parent 156 corresponding to the first process 136A. If the second process 136B forks again without performing an exec operation, to create a new child of a third process 136C, the third process 136C also has exec parent corresponding to the first process 136A, even though the third process 136C has an OS parent of the second process 136B. This exec parent notion allows embodiments of the present disclosure to track processes 136 beyond the process tree to focus on executable images instead of direct OS relationship.

The process tracking engine 155 may be configured to detect the creation and operations of the processes 136 and to maintain the PID-to-UPID mapping store 160 to associate a generated UPID 154 and an exec parent 156 with processes 136 of the operating system 115. In some embodiments, the PID-to-UPID mapping store 160 may be initialized to an invalid state (e.g., 0) for each UPID 154 and exec parent 156.

The process tracking engine 155 may add hooks 144 into the execution stream of the operating system 115. The hooks 144 may detect operations for a fork and exec by the process management engine 132. In some embodiments, the hooks 144 may allow the process tracking engine 155 to be called and/or notified when a fork operation or an exec operation is performed, both of which may be performed by system calls that execute operations within the kernel space 130.

In response to detecting an exec operation, the process tracking engine 155 may generate a new UPID 154 for the process 136 performing the exec operation. The process tracking engine 155 may update the PID-to-UPID mapping store 160 to associate the process 136 performing the exec operation with the generated UPID 154. If the exec operation is performed in the context of a same process 136 that has previously performed an exec operation, the exec parent may be updated to be the prior UPID 154 of the same process 136.

In response to detecting a fork operation that generates a new process 136, the process tracking engine 155 may update the PID-to-UPID mapping store 160 to associate the new process 136 with an invalid value (e.g., 0) for the UPID 154. Because this new process 136 has resulted from a fork operation but has not yet performed an exec operation, it may not be assigned a valid value for a UPID 154.

In addition, the process tracking engine 155 may perform a lookup in the PID-to-UPID mapping store 160 for an entry associated with the parent process 136 of the new process 136. If the parent process 136 has an invalid value (e.g., 0) for the UPID 154, it may indicate that the parent process 136 has not yet performed an exec operation (e.g., if a forked process 136 immediately forks without performing an exec operation first, as in the example of FIG. 2A). In this case, the exec parent 156 of the new process 136 within the PID-to-UPID mapping store 160 may be set to be the exec parent 156 of the parent process 136.

If the parent process 136 has a valid value (e.g., non-0) for the UPID 154, it may indicate that the parent process 136 has already performed an exec operation. In this case, the exec parent 156 of the new process 136 within the PID-to-UPID mapping store 160 may be set to be the UPID 154 of the parent process 136.

The described operations are not intended to limit the embodiments of the present disclosure. In some cases, a process 136 may be assigned a UPID 154 for operations beyond those of just an exec operation. For example, in some cases, a process 136 may be assigned a UPID 154 for operations such as accessing a network connected to the computing device 120, performing an access to storage (e.g., storage device 126), accessing specialized hardware, such as a cryptographic device and/or graphics processing unit (GPU), or other computing operation. In such embodiments, the process tracking engine 155 may be configured to detect these UPID generating operations and perform operations to generate the UPID 154 to associate with the process 136.

For example, upon detecting such operations, the process tracking engine 155 may perform a lookup into the PID-to-UPID mapping store 160 to determine whether the process 136 performing such an activity already is assigned a UPID 154. If not, a UPID 154 may be assigned to the process 136 and stored in the PID-to-UPID mapping store 160. In some embodiments, the exec parent may not change for the associated process 136, because embodiments of the present disclosure may track executable images.

As will be appreciated by those of skill in the art, the above-described operations do not require locking or reference counting and thus may work reliably in infrastructures similar to eBPF. For example, locks may not be needed because the operations may update the PID-to-UPID mapping store 160 under scenarios which may not need locking to maintain consistency in a concurrent environment (e.g., in a multiprocessing environment). For example, the PID-to-UPID mapping store 160 may be updated within the hooks 144 for exec, filesystem, and network system calls for a given process 136, but may update entries in the PID-to-UPID mapping store 160 for only that process 136. Since the process 136 may be frozen in a system call at the time of the update to the PID-to-UPID mapping store 160, no other hooks 144 may operate concurrently on behalf of that process 136. For example, in the hook 144 for a fork operation, the tracking entries in the PID-to-UPID mapping store 160 may be updated for both the parent and child processes 136, but since both parent and child processes 136 are frozen during this fork system call, concurrent updates to the same entries are avoided.

Though the above discussion describes operations with respect to processes 136, the embodiments of the present disclosure are not limited to such a configuration. In some embodiments, the same or similar processing may be performed with respect to the generating of new threads, in a threaded environment, as illustrated in FIG. 1. In thread environments, tracking may be based on thread IDs (or thread group IDs) rather than, or in addition to, process IDs 134.

Figure 3A:
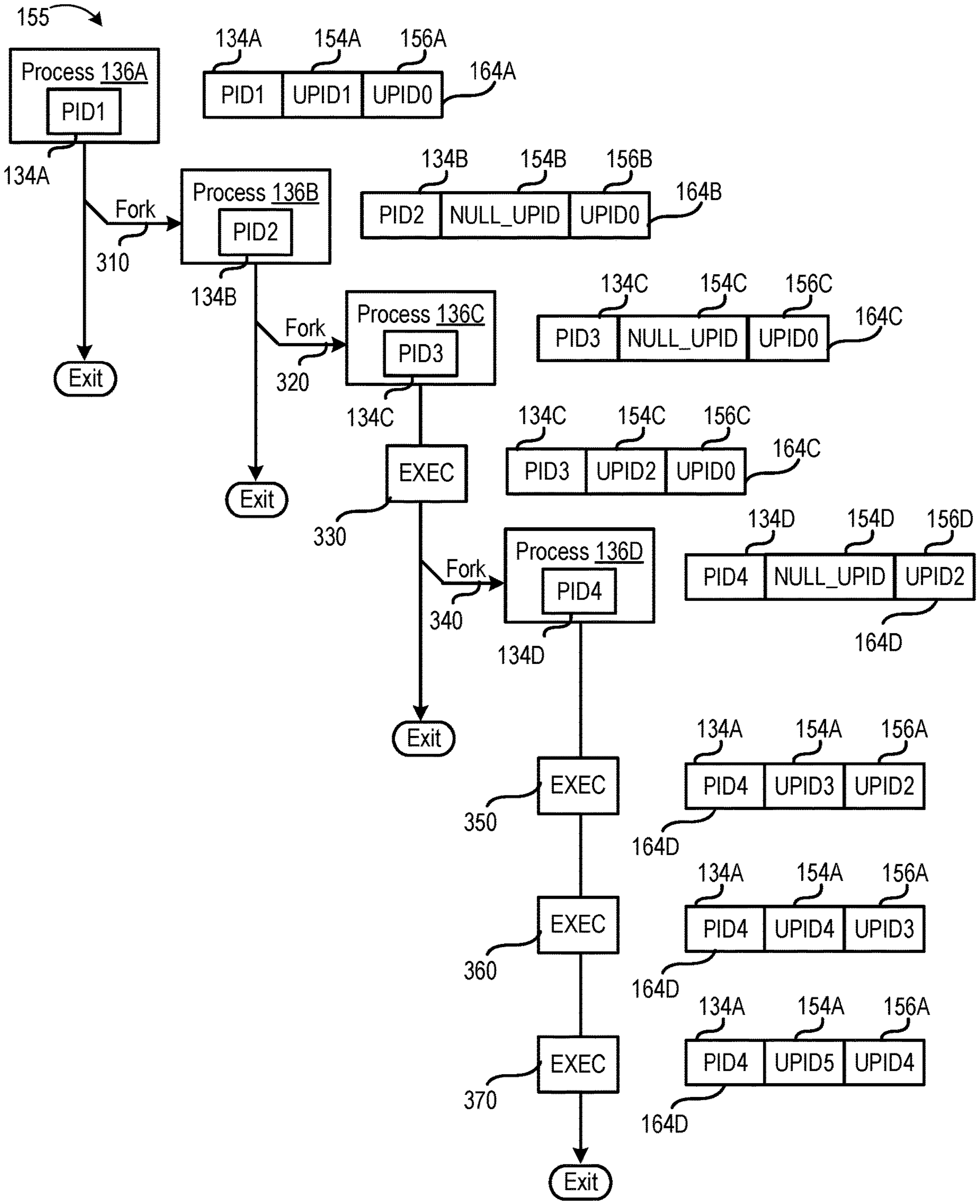
FIG. 3A is a block diagram illustrating an example of the operations of the process tracking engine, in accordance with some embodiments of the present disclosure.

FIG. 3A is a block diagram illustrating an example of the operations of the process tracking engine 155, in accordance with some embodiments of the present disclosure. FIG. 3A is an example only, and is not intended to limit the embodiments of the present disclosure. A description of those elements of FIG. 3A that have been previously described will be omitted for brevity.

Referring to FIGS. 1 and 3A, a first process 136A may be generated within operating system 115. For the purposes of explanation, it is assumed that the first process 136A was created at some point during the operation of the operating system 115. The first process 136A may have a first PID 134A having a value of PID1. The first process 136A may be associated with a first entry 164A in the PID-to-UPID mapping store 160. The first entry 164A in the PID-to-UPID mapping store 160 may include a mapping indicating a correspondence between the first PID 134A of PID1, a first UPID value 154A of UPID1, and a first exec parent value 156A of UPID0.

In FIG. 3A, the first process 136A performs a fork operation 310 that creates a second process 136B having a second PID 134B with a value of PID2. Upon detecting the creation of the second process 136B, the process tracking engine 155 may update a second entry 164B in the PID-to-UPID mapping store 160 to associate a second UPID 154B having an invalid value (illustrated as NULL_UPID) to associate with the second PID 134B. In addition, since the parent (in this case, the first process 136A) has not yet performed an exec operation, a second exec parent 156B of the second entry 164B may be set to the exec parent 156A of the parent process 136A, in this case, the value of UPID0.

The second process 136B may perform a fork operation 320 that creates a third process 136C having a third PID 134C with a value of PID3. Upon detecting the creation of the third process 136C, the process tracking engine 155 may update a third entry 164C in the PID-to-UPID mapping store 160 to associate a third UPID 154C having an invalid value (illustrated as NULL_UPID) to associate with the third PID 134C. In addition, since the parent (in this case, the second process 136B) has not yet performed an exec operation, a third exec parent 156C of the third entry 164C may be set to the exec parent 156A of the parent process 136A, in this case, the value of UPID0.

The third process 136C may then perform an exec operation 330. Upon detecting the exec operation 330, the process tracking engine may generate a new UPID value of UPID2, and may update the third entry 164C in the PID-to-UPID mapping store 160 to alter the third UPID 154C associated with the third PID 134C to the newly-generated value UPID2. Because the third process 136C has now performed an exec operation 330, which results in a new set of instruction codes being loaded as described herein with respect to FIGS. 2A and 2B, the process tracking engine 155 has generated associated tracking mechanisms (e.g., a UPID 154) to track its activities.

In some embodiments, the generation of the new UPID 154 for the third process 136C may result in a message 180 being sent to the message buffer 190 (see FIG. 1). The message 180 may include, for example, the third PID 134C (PID3), the third UPID 154C (UPID2), and/or the third exec parent 156C (UPID0). The message 180 may be processed by the application 140 after accessing the message buffer 190, and may include the information in process activity data 175 (see FIG. 1).

After the exec operation 330, the third process 136C may perform a fork operation 340 that creates a fourth process 136D having a fourth PID 134D with a value of PID4. Upon detecting the creation of the fourth process 136D, the process tracking engine 155 may update a fourth entry 164D in the PID-to-UPID mapping store 160 to associate a fourth UPID 154D having an invalid value (illustrated as NULL_UPID) to associate with the fourth PID 134D. In addition, since the parent (in this case, the third process 136C) has previously performed an exec operation (e.g., exec operation 330), a fourth exec parent 156D of the fourth entry 164D may be set to the third UPID 154C of the third process 136C, in this case, the value of UPID2. This may indicate that the process associated with UPID2 was responsible for loading the current instruction set into the entity associated with PID4, even though this process does not yet have an assigned UPID 154.

The fourth process 136D may then perform an exec operation 350. Upon detecting the exec operation 350, the process tracking engine 155 may generate a new UPID value of UPID3, and may update the fourth entry 164D in the PID-to-UPID mapping store 160 to alter the fourth UPID 154D associated with the fourth PID 134D to the newly-generated value UPID3. The fourth exec parent 156D having a value of UPID2 may remain the same. This may indicate that the process associated with UPID2 was responsible for loading the current instruction set into the entity associated with UPID3. As previously described, the generation of the new value for the fourth UPID 154D may result in a message 180 being sent to the message buffer 190 informing the application 140 of the new UPID 154.

The fourth process 136D may again perform an exec operation 360. Upon detecting the exec operation 360, the process tracking engine 155 may generate a new UPID value of UPID4, and may update the fourth entry 164D in the PID-to-UPID mapping store 160 to alter the fourth UPID 154D associated with the fourth PID 134D to the newly-generated value UPID4. Because the fourth process 136D has previously performed an exec operation (e.g., exec operation 350), the fourth exec parent 156D may be changed to the UPID 154 of the fourth process 136D prior to the exec operation 360, in this case a value of UPID3. This may indicate that the process associated with UPID3 was responsible for loading the current instruction set into the entity associated with UPID4. As previously described, the generation of the new value for the fourth UPID 154D may result in a message 180 being sent to the message buffer 190 informing the application 140 of the new UPID 154.

The fourth process 136D may again perform an exec operation 370. Upon detecting the exec operation 370, the process tracking engine 155 may generate a new UPID value of UPID5, and may update the fourth entry 164D in the PID-to-UPID mapping store 160 to alter the fourth UPID 154D associated with the fourth PID 134D to the newly-generated value UPID5. Because the fourth process 136D has previously performed an exec operation (e.g., exec operation 360), the fourth exec parent 156D may be changed to the UPID 154 of the fourth process 136D prior to the exec operation 370, in this case a value of UPID4. This may indicate that the process associated with UPID4 was responsible for loading the current instruction set into the entity associated with UPID5. As previously described, the generation of the new value for the fourth UPID 154D may result in a message 180 being sent to the message buffer 190 informing the application 140 of the new UPID 154.

The example illustrated in FIG. 3A shows that the exec parent value 156 may be used to effectively track the source process 136 spawning a change in instructions (e.g., which process 136, as tracked by a UPID 154) that caused the change to the current set of instructions, even when that provenance is not clearly illustrated within the process tree itself. In addition, embodiments of the present disclosure may be performed in a lock-safe manner that may be executed in infrastructures such as those of eBPF despite not having access to locking mechanisms. The embodiments of the present disclosure as described with respect to FIG. 3A represent an improvement to the operation of the computing device 120, as well as a technical improvement to the field of process tracking. By establishing and maintaining the exec parent, the provenance of the instruction codes of a given process 136 may be tracked. Such information is not capable of being determined simply from a process tree of an operating system 115.

Figure 3B:
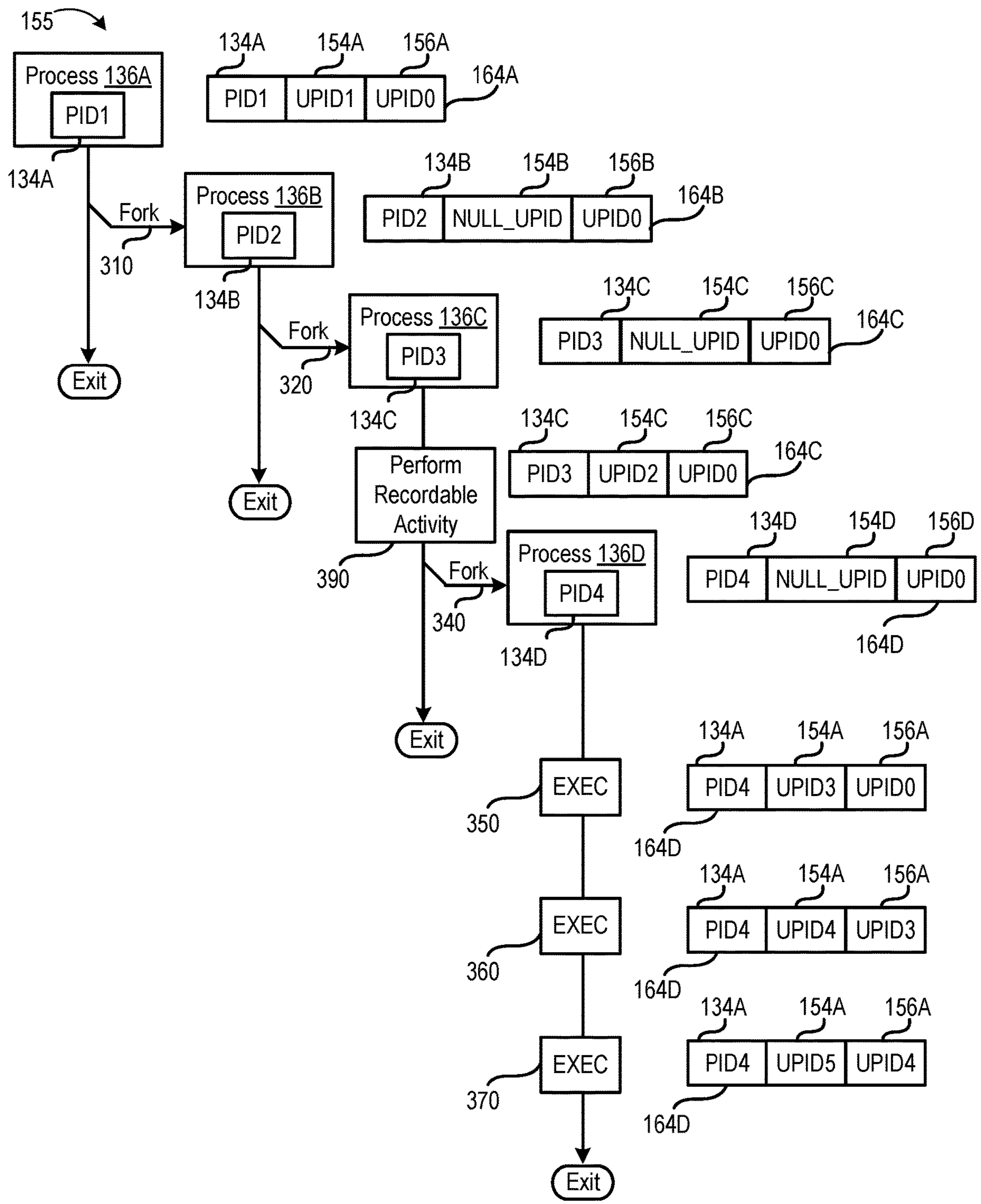
FIG. 3B is a block diagram illustrating an example of the operations of the process tracking engine, in accordance with some embodiments of the present disclosure.

As previously described, the embodiments of the present disclosure are not limited to those embodiments in which a UPID 154 is generated upon the execution of an exec operation. In some embodiments a new UPID 154 may be generated upon detection of an activity by a process 136 which the process tracking engine 155 wishes to record. FIG. 3B is a block diagram illustrating an example of the operations of the process tracking engine 155, in accordance with some embodiments of the present disclosure. FIG. 3B is an example only, and is not intended to limit the embodiments of the present disclosure. A description of those elements of FIG. 3B that have been previously described will be omitted for brevity.

In FIG. 3B, the operations of the creations of a first process 136A, a second process 136B, and a third process 136C may be similar to those described herein with respect to FIG. 3A. As a result, those operations will not be described. In FIG. 3B, the scenario with respect to the third process 136C differs, however, in that, rather than performing an exec operation, the third process 136C (having the third PID 134C with a value of PID3) instead performs a recordable activity 390. The recordable activity 390 may be some activity of interest to the process tracking engine 155 that the process tracking engine 155 may be able to detect. Examples of a recordable activity 390 include, but are not limited to, accessing a network connected to the computing device 120, performing an access to storage (e.g., storage device 126), accessing specialized hardware, such as a cryptographic device and/or graphics processing unit (GPU), or other computing operation.

Upon detecting the recording activity 390, the process tracking engine may generate a new UPID value of UPID2, and may update the third entry 164C in the PID-to-UPID mapping store 160 to alter the third UPID 154C associated with the third PID 134C to the newly-generated value UPID2. Because the third process 136C has now performed the recordable activity 390 of interest to the process tracking engine 155, the process tracking engine 155 has generated associated tracking mechanisms (e.g., a UPID 154) to track its activities. In some embodiments, the generation of the new value for the third UPID 154C may result in a message 180 being sent to the message buffer 190 informing the application 140 of the new UPID 154.

After performing the recordable activity 390, the third process 136C may perform a fork operation 340 that creates a fourth process 136D having a fourth PID 134D with a value of PID4. Upon detecting the creation of the fourth process 136D, the process tracking engine 155 may update a fourth entry 164D in the PID-to-UPID mapping store 160 to associate a fourth UPID 154D having an invalid value (illustrated as NULL_UPID) to associate with the fourth PID 134D. In addition, since the parent (in this case, the third process 136C) has not previously performed an exec operation (in contrast to the example of FIG. 3A), a fourth exec parent 156D of the fourth entry 164D may be set to the third exec parent 156C of the third process 136C, in this case, the value of UPID0.

The fourth process 136D may then perform an exec operation 350. Upon detecting the exec operation 350, the process tracking engine 155 may generate a new UPID value of UPID3, and may update the fourth entry 164D in the PID-to-UPID mapping store 160 to alter the fourth UPID 154D associated with the fourth PID 134D to the newly-generated value UPID3. The fourth exec parent 156D having a value of UPID0 may remain the same. In some embodiments, the generation of the new value for the fourth UPID 154D may result in a message 180 being sent to the message buffer 190 informing the application 140 of the new UPID 154.

The fourth process 136D may again perform an exec operation 360. Upon detecting the exec operation 360, the process tracking engine 155 may generate a new UPID value of UPID4, and may update the fourth entry 164D in the PID-to-UPID mapping store 160 to alter the fourth UPID 154D associated with the fourth PID 134D to the newly-generated value UPID4. Because the fourth process 136D has previously performed an exec operation (e.g., exec operation 350), the fourth exec parent 156D may be changed to the UPID 154 of the fourth process 136D prior to the exec operation 360, in this case a value of UPID3. This may indicate that the process associated with UPID3 was responsible for loading the current instruction set into the entity associated with UPID4. In some embodiments, the generation of the new value for the third UPID 154C may result in a message 180 being sent to the message buffer 190 informing the application 140 of the new UPID 154.

The fourth process 136D may again perform an exec operation 370. Upon detecting the exec operation 370, the process tracking engine 155 may generate a new UPID value of UPID5, and may update the fourth entry 164D in the PID-to-UPID mapping store 160 to alter the fourth UPID

154D associated with the fourth PID 134D to the newly-generated value UPID5. Because the fourth process 136D has previously performed an exec operation (e.g., exec operation 360), the fourth exec parent 156D may be changed to the UPID 154 of the fourth process 136D prior to the exec operation 370, in this case a value of UPID4. This may indicate that the process associated with UPID4 was responsible for loading the current instruction set into the entity associated with UPID5. In some embodiments, the generation of the new value for the third UPID 154C may result in a message 180 being sent to the message buffer 190 informing the application 140 of the new UPID 154.

The example illustrated in FIG. 3B shows that the exec parent value 156 may be used to effectively track the source process 136 spawning a change in instructions (e.g., which process 136, as tracked by a UPID 154) even while other mechanisms (such as UPID 154) are altered to detect different types of recordable activity. In comparing the values of the exec parent 156 between FIGS. 3A and 3B, it can be seen that they differ with respect to the initial values associated with the table entries 164 associated with the fourth process 136D. These variations are the result of the fact that the activity used to generate the value for the UPID 154 in the example of FIG. 3B was not an exec operation, but another recordable activity 390 that did not alter the instruction codes of the third process 136C.

As described herein, upon detection of activity associated with a process (e.g., creation, fork operation, exec operations, and/or other recordable activity) the process tracking engine 155 may generate an entry in the PID-to-UPID mapping store 160 that maps a PID value 134 to a UPID value 154, and/or an exec parent 156. In some embodiments, the PID-to-UPID mapping 162 may allow for executing code instructions that have a reference to a value of a PID 134 to retrieve the value of a UPID 154 and/or the exec parent 156 that corresponds to the PID 134. In some embodiments, the PID-to-UPID mapping store 160 may be a portion of memory that is accessible by the application 140 in user space 135. In some embodiments, the PID-to-UPID mapping store 160 may be an array that is indexed by the value of the PID 134. For example, a PID 134 having a value of 5 may be found at a fifth location (or sixth location if the PID-to-UPID mapping store 160 supports PID values of 0) within the PID-to-UPID mapping store 160. This is only an example of how the PID-to-UPID mapping store 160 may be implemented, and other techniques for mapping from the PID 134 to the UPID 154 and/or the exec parent 156 may be utilized without deviating from the embodiments of the present disclosure. Thus, given a particular value for the PID 134, the UPID 154 and/or the exec parent 156 may be quickly determined.

The use of the process tracking engine 155 may allow for improved access to and/more accurate information about, the process creation process performed by the process management engine 132. Because the process tracking engine 155 is executing in kernel space 130, it may have inline access to process creation and may be able to quickly detect the creation of new processes 136 and their associated PIDs 134, as well as detecting fork and exec operations performed by the processes 136. The PID-to-UPID mapping store 160 may be relatively simple to maintain, and therefore may not require excessive computational power or memory space.

In addition to populating the PID-to-UPID mapping store 160, the process tracking engine 155 may create a message 180 that includes the value of the created PID 134, the value of the created UPID 154, and/or the value of the exec parent 156. The message 180 may be transmitted to the message buffer 190 for later retrieval by the application 140.

As part of an operation of the application 140 within user space 135, the application 140 may monitor the message buffer 190 for messages 180 from the application extension 150 executing in kernel space 130. As a result of this monitoring, the application 140 may detect a message 180 from the process tracking engine 155 that resulted from the creation of a UPID 154 and/or exec parent 156 that maps to a newly-created PID 134.

Responsive to the message 180 in the message buffer 190, the application 140 may create and/or update a UPID-to-PID mapping store 165. For example, the application 140 may generate a mapping that maps a UPID value 154 to a PID value 134 and/or an exec parent value 156, and place the mapping within a UPID-to-PID mapping store 165. In some embodiments, the UPID-to-PID mapping store 165 may allow for executing code instructions that have a reference to a value of a UPID 154 to retrieve the value of a PID 134 and/or an exec parent 156 that correspond to the UPID 154. In some embodiments, the UPID-to-PID mapping store 165 may be maintained separately from, and in a different format, from the PID-to-UPID mapping store 160. In some embodiments, the UPID-to-PID mapping store 165 may be a sorted tree that utilizes the UPID 154 to identify a leaf of the tree that contains the PID 134 and/or the exec parent 156. For example, the UPID-to-PID mapping store 165 may be implemented as an AVL tree. Though an AVL tree is described as an example for the UPID-to-PID mapping store 165, it is an example only, and not intended to limit the embodiments of the present disclosure. It will be understood that other formats, trees, or mapping mechanisms may be used for the UPID-to-PID mapping store 165 without deviating from the embodiments of the present disclosure.

In FIG. 1, it is illustrated that the message 180 contains a UPID 154, an exec parent 156, and a PID 134, but the embodiments of the present disclosure are not limited to this configuration. In some embodiments, the message 180 may contain only the PID 134. In such an embodiment, the application 140, upon receiving the message 180, may access the PID-to-UPID mapping store 160 to retrieve the associated UPID 154 and/or the associated exec parent 156 for the provided PID 134.

The operations of the application 140 with respect to the creation and/or maintenance of the UPID-to-PID mapping store 165 may be performed asynchronously with respect to the operations of the process tracking engine 155. Thus, the process tracking engine 155 may be able to perform time-sensitive operations related to the creation of a process 136 and an associated PID 134 so as to create a UPID 154 and/or exec parent 156 to track the new PID 134. The finalization of the UPID-to-PID mapping 168, which may include operations to rebalance the UPID-to-PID mapping store 165, may be performed as a lazy update, thus reducing the number of operations performed in the kernel space 130, which may be resource and/or performance sensitive.

In addition, because the maintenance of the UPID-to-PID mapping store 165 may be more complex, it may be more efficiently handled by application 140 in user space 135, rather than through the use of application extension 150 in kernel space 130. The user space 135 may have access to a more extensive array of APIs or other software executable code than may be available to the application extension 150 in the execution engine 170.

In some embodiments, the application 140 may generate process activity data 175 associated with a given process 136. The process activity data 175 may track information about activities of the process 136. For example, information about the creation of the process, activities (e.g., system calls, network access, etc.) of the process 136, other children processes 136 created by the process 136, an exec parent 156 of the process 136, a termination of the process 136, and the like may be collected and tracked. In some embodiments, the application 140 may receive the process activity data 175 from the application extension 150 executing in the kernel space 130 of the operating system 115. For example, the application extension 150 may utilize the hooks 144 and/or other mechanisms within the operating system 115 to capture events associated with processes 136 executing on the operating system 115. These events may be transferred to the application 140 (e.g., utilizing message buffer 190) and used to generate the process activity data 175. In some embodiments, the process activity data 175 may be generated and/or modified to include the UPID 154 and/or the exec parent 156 that are associated with the PID 134 of the process 136. In some embodiments, the process activity data 175 may be transmitted externally to the computing device 120. The use of the pseudo-unique UPID 154 may allow for the process activity data 175 of the process 136 to be uniquely tracked with respect to other processes 136 of the computing device 120, even if PIDs 134 are reused. In addition, the use of the exec parent 156 may allow for tracking of which UPIDs 154 are associated with changes of instruction codes within children processes 136.

Though FIG. 1 illustrates the process activity data 175 as part of the application 140, this is merely for convenience of description and is not intended to limit the embodiments of the present disclosure. In some embodiments, the process activity data 175 may be generated by other applications utilizing the UPID 154.

The system 100 may provide for an improved capability to track processes 136 in environments in which a PID 134 may be re-used and complex exec/fork operations may be performed. For example, by creating a UPID 154 that maps to a newly created PID 134 at the time of creation (e.g., inline in the kernel space 130), a unique PID 154 may be created that may be pseudo-unique over the reasonable use of the system 100. If application 140 is tracking the execution of processes 136, it may correctly attribute operations of a given process 136 through the use of the UPID 154, even if the PID 134 of the process 136 is re-used after the exit of the process 136. In addition, the use of the exec parent 156 may allow for a more simplified view of the process hierarchy to be maintained, where a given UPID 154 has an exec parent 156 that indicates which other UPID 154 in the hierarchy of the process was ultimately responsible for the change in instruction codes of the child UPID. Thus, even if a piece of malware attempts to perform multiple fork and exec operations to obfuscate the source of a given set of instructions, embodiments of the present disclosure may allow for this change of instructions to be clearly tracked.

Figure 4A:
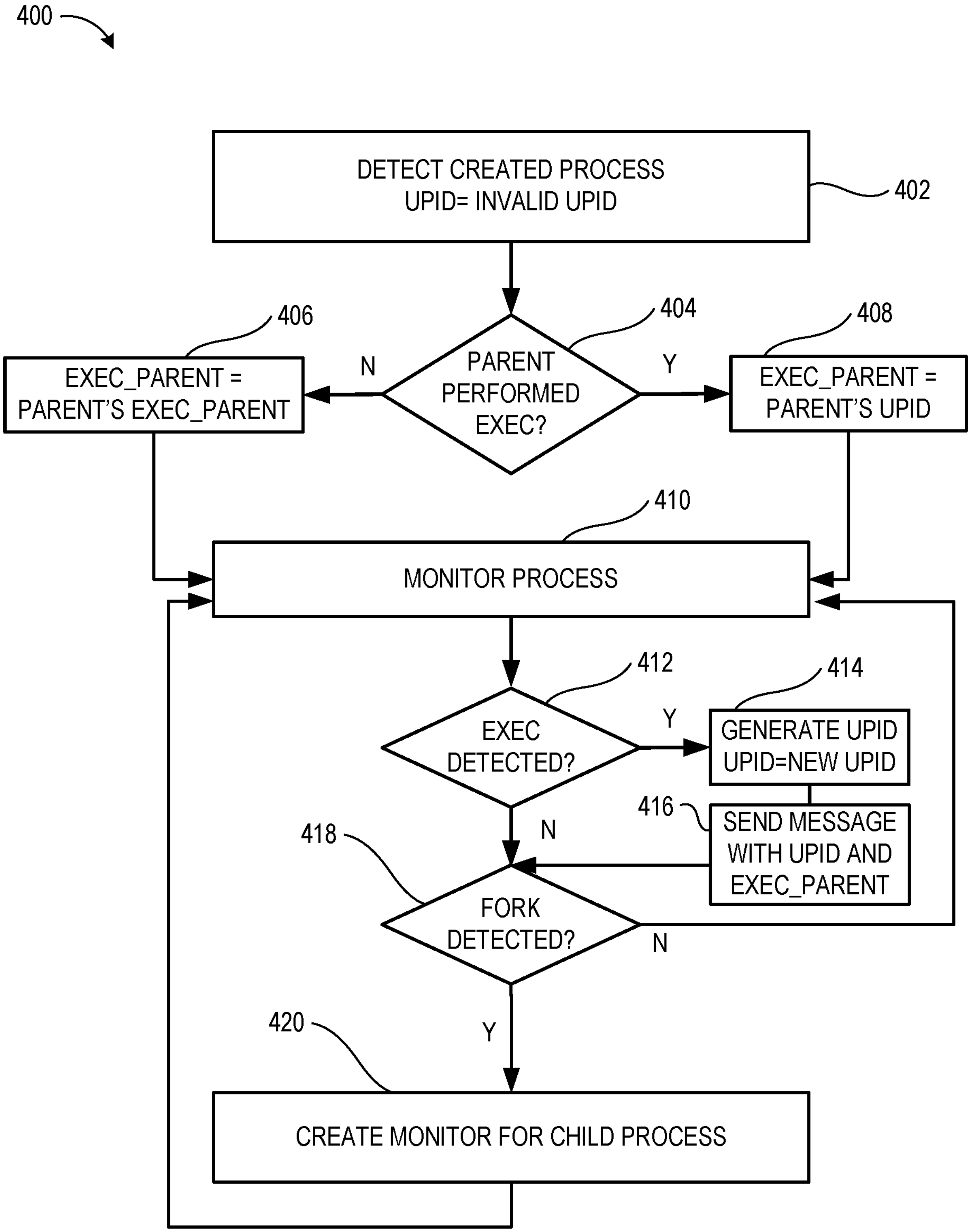
FIG. 4A is a flow diagram of a method of generating an exec parent according to some embodiments of the present disclosure.

FIG. 4A is a flow diagram of a method 400 of generating an exec parent according to some embodiments of the present disclosure. A description of elements of FIG. 4A that have been previously described will be omitted for brevity. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120).

With reference to FIG. 4A, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 and 4A as well, the method 400 begins at block 402, in which the creation of a process 136 is detected. In some embodiments, creation of the process 136 may be detected by executable instructions in the kernel space 130 of an operating system 115, such as the process tracking engine 155 described herein with respect to FIG. 1. In some embodiments, the creation of the process may be detected by hooks 144 that detect operations of a process management engine 132 of the kernel space 130. In some embodiments, upon detection of the creation of the process, a UPID 154 associated with the created process 136 may be set to an initial value. In some embodiments, the initial value may be a value intended to represent an invalid value for the UPID 154, such as the value of 0.

At block 404, it may be determined if a parent process 136 of the created process 136 has ever performed an exec operation. As used herein, a parent process 136 may refer to a process 136 that performed the operations to create the process 136 detected in block 402. In some embodiments, as described herein, determining whether the parent process 136 has performed an exec operation may be based on whether the parent process 136 has a valid value for its UPID 154 (as determined by an access to the PID-to-UPID mapping store 160 based on a PID 134 of the parent process 136). In some embodiments, an invalid value of a UPID 154 for a given process 136 may be replaced with a valid value for the UPID 154 upon detection of an exec operation. However, the embodiments of the present disclosure are not limited to such a configuration. In some embodiments, additional tracking may be utilized that stores a value for a given process 136 whenever an exec operation is performed, and the operation of block 404 may examine that value for the parent process 136 to determine if the parent process 136 has ever performed an exec operation.

If the parent process has not previously performed an exec operation (block 404:N), the exec parent 156 associated with the process 136 that was detected in block 402 may be set to the exec parent 156 of the parent process 136 in block 406.

If the parent process has previously performed an exec operation (block 404: Y), the exec parent 156 associated with the process 136 that was detected in block 402 may be set to the UPID 154 of the parent process 136 in block 408.

At block 410, activity of the created process 136 may be monitored. For example, the process tracking engine 155 may monitor operations performed in the user space 135 and/or the kernel space 130 by the created process 136. In some embodiments, the monitoring operation may be performed by, or assisted by, the hooks 144 within the kernels space 130.

At block 412, it may be determined whether an exec operation has been detected as being performed by the created process 136. If an exec operation is detected (block 412: Y), the method 400 may continue to block 414, in which a new UPID 154 is generated for the newly created process 136. As described herein, the UPID 154 may be a pseudo-unique value that allows the operations of the process 136 to be uniquely identified and tracked, even if the PID 134 of the process 136 is reused. The PID 134 of the created process 136 may be associated with the newly created UPID 154. In addition, at block 416, a message 180 may be sent (e.g., to application 140). In some embodiments, the message 180 may be sent to a message buffer 190 that is accessible by application 140. The message 180 may include the created UPID 154 and the exec parent 156 of the created process 136.

At block 418, it may be determined whether a fork operation has been detected as being performed by the created process 136. If a fork operation is detected (block 418: Y), the method 400 may continue to block 420 where a monitor is created for the child process 136 of the fork operation. The monitor may begin the operations of method 400 again. After beginning the monitoring of the child process 136 resulting from the fork operation, the operations may revert to block 410 where the process monitoring continues. Similarly, if a fork operation is not detected (block 418:N), the method 400 may continue the monitoring of the process 136.

The method 400 illustrated in FIG. 4A may allow for a relatively straightforward algorithm to detect and track processes 136 within an operating system 115. The method 400 may allow for the generation and tracking of an exec parent 156. The exec parent 156 may provide data regarding the provenance of instruction codes within a process tree (e.g., which processes 136 are responsible for replacing code instructions in later processes 136). This additional information may enhance the computer technology of process tracking by allowing for more sophisticated analysis than would be provided by the process tree alone.

Figure 4B:
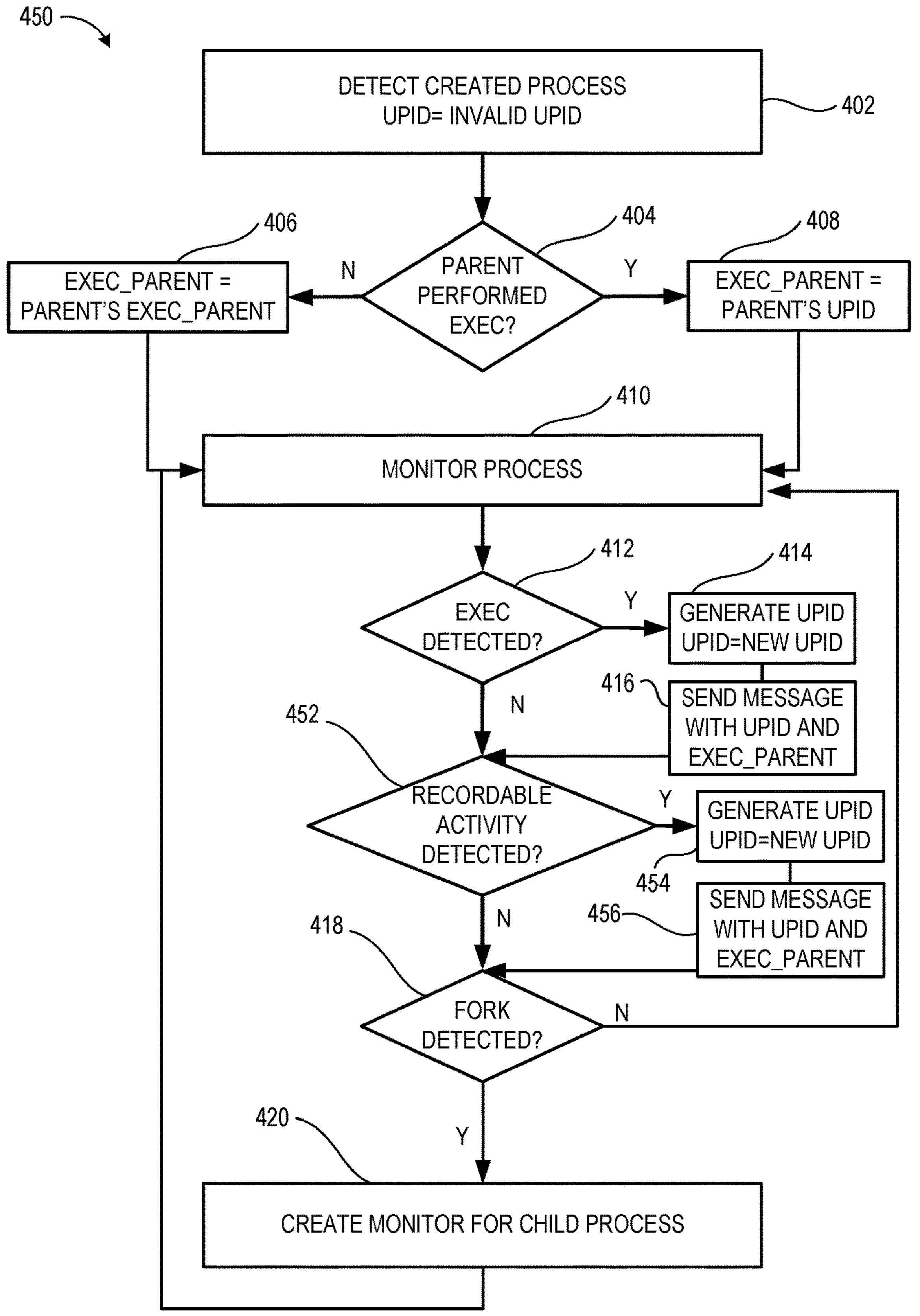
FIG. 4B is a flow diagram of a method of generating an exec parent according to some embodiments of the present disclosure.

As described herein, in some embodiments, a UPID 154 may be generated for other activities beyond an exec operation. FIG. 4B is a flow diagram of a method 450 of generating an exec parent according to some embodiments of the present disclosure. A description of elements of FIG. 4B that have been previously described will be omitted for brevity. Method 450 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 450 may be performed by a computing device (e.g., computing device 120).

With reference to FIG. 4B, method 450 illustrates example functions used by various embodiments. Although specific function blocks ("blocks") are disclosed in method 450, such blocks are examples. That is, embodiments are well suited to performing various other blocks or variations of the blocks recited in method 450. It is appreciated that the blocks in method 450 may be performed in an order different than presented, and that not all of the blocks in method 450 may be performed.

Referring simultaneously to FIGS. 1 and 4B as well, the method 450 begins at block 402, in which the creation of a process 136 is detected. The operations of block 402, as well as those of blocks 404, 406, 408, 410, 412, 414, and 416 may be substantially similar to those of FIG. 4A, and a description thereof will be omitted.

In FIG. 4B, if an exec operation is not detected (block 412:N), the method 450 may include block 452, in which it may be determined if the created process 136 as performed a recordable activity. As described herein, recordable activity may include operations such as accessing a network connected to the computing device 120, performing an access to storage (e.g., storage device 126), accessing specialized hardware, such as a cryptographic device and/or graphics processing unit (GPU), or other computing operation.

If recordable activity by the process 136 is detected (block 452: Y), the method 450 may continue to block 454, in which a new UPID 154 is generated for the newly created process 136. The PID 134 of the created process 136 may be associated with the newly created UPID 154. In addition, at block 456, a message 180 may be sent (e.g., to application 140). In some embodiments, the message 180 may be sent to a message buffer 190 that is accessible by application 140. The message 180 may include the created UPID 154 and the exec parent 156 of the created process 136. The creation of a UPID 154 for a process 136 after recordable activity is detected may allow for the tracking activities of the application 140 to begin once the process 136 has been detected performing actions that may be consistent with a threat to the computing device 120, even if the process 136 has not yet performed an exec operation.

At block 418, it may be determined whether a fork operation has been detected as being performed by the created process 136, as described herein with respect to FIG. 4A. Accordingly, a duplicate descriptions of the operations of blocks 418 and 420 will be omitted.

Method 450 may provide the creation of a UPID 154 for a process 136 after recordable activity is detected. This may allow for the tracking activities of the application 140 to begin once the process 136 has been detected performing actions that may be consistent with a threat to the computing device 120, even if the process 136 has not yet performed an exec operation.

Figure 5:
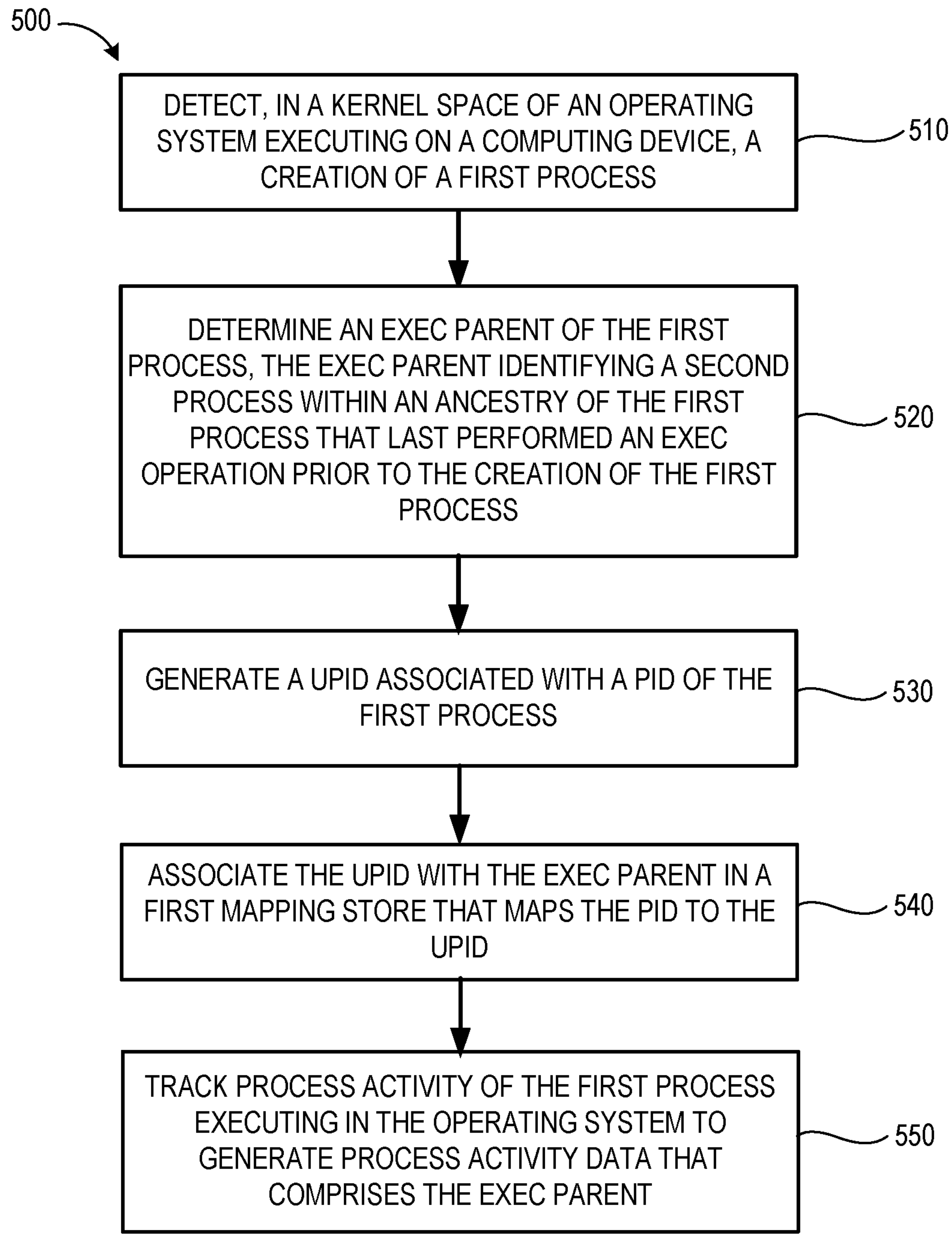
FIG. 5 is a flow diagram of a method \ of tracking processes in an operating system, according to some embodiments of the present disclosure.

FIG. 5 is a flow diagram of a method 500 of tracking processes in an operating system, according to some embodiments of the present disclosure. A description of elements of FIG. 5 that have been previously described will be omitted for brevity. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120).

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring simultaneously to FIGS. 1, 2A 2B, 3A, 3B, 4A, and 4B as well, the method 500 begins at block 510, in which a creation of a first process is detected in a kernel space of the operating system executing on a computing device. The first process may be similar to process 136 described herein. The kernel space may be similar to kernel space 130 of an operating system 115 of a computing device 120, as described herein with respect to FIGS. 1 to 4B.

At block 520, an exec parent of the first process is determined. The exec parent may identify a second process within an ancestry of the first process that last performed an exec operation prior to the creation of the first process. The exec parent may be similar to the exec parent 156 described herein with respect to FIGS. 1 to 4B. The exec operation may be similar to the exec operation described herein with respect to FIGS. 1 to 4B, such as exec operation 230 described herein with respect to FIGS. 2A and 2B. In some embodiments, the second process is a different process from a third process that created the first process. In some embodiments, the exec parent is determined by an application extension executing in an extended Berkeley packet filter (eBPF) infrastructure within the operating system of the computing device.

In some embodiments, the exec parent of the first process is a first exec parent. In some embodiments, determining the first exec parent of the first process comprises, responsive to determining that a parent process of the first process has performed the exec operation prior to creating the first process, setting the first exec parent of the first process to a value associated with the parent process of the first process, or, responsive to determining that the parent process of the first process has not performed the exec operation prior to creating the first process, setting the first exec parent of the first process to a second exec parent of the parent process of the first process.

At block 530, a UPID associated with a PID of the first process is generated. The UPID and PID may be similar to the UPID 154 and the PID 134, respectively, described herein with respect to FIGS. 1 to 4. In some embodiments, the exec operation performed by the second process is a first exec operation, and generating the UPID associated with the PID of the first process is performed responsive to at least one of detecting the first process performing a second exec operation, detecting a network operation by the first process, or detecting access of a storage device by the first process. In some embodiments, the UPID is a first UPID, and the exec parent of the first process comprises a second UPID of the second process.

At block 540, the UPID is associated with the exec parent in a first mapping store that maps the PID to the UPID. The first mapping store may be similar to the PID-to-UPID mapping store 160 described herein with respect to FIGS. 1 to 4B.

At block 550, process activity of the first process executing in the operating system is tracked to generate process activity data that comprises the exec parent. The process activity data may be similar to the process activity data 175 described herein with respect to FIGS. 1 to 4B.

In some embodiments, method 500 further includes transmitting a message comprising the PID to a message buffer structure. The message and message buffer structure may be similar to message 180 and message buffer 190 described herein with respect to FIGS. 1 to 4B.

Figure 6:
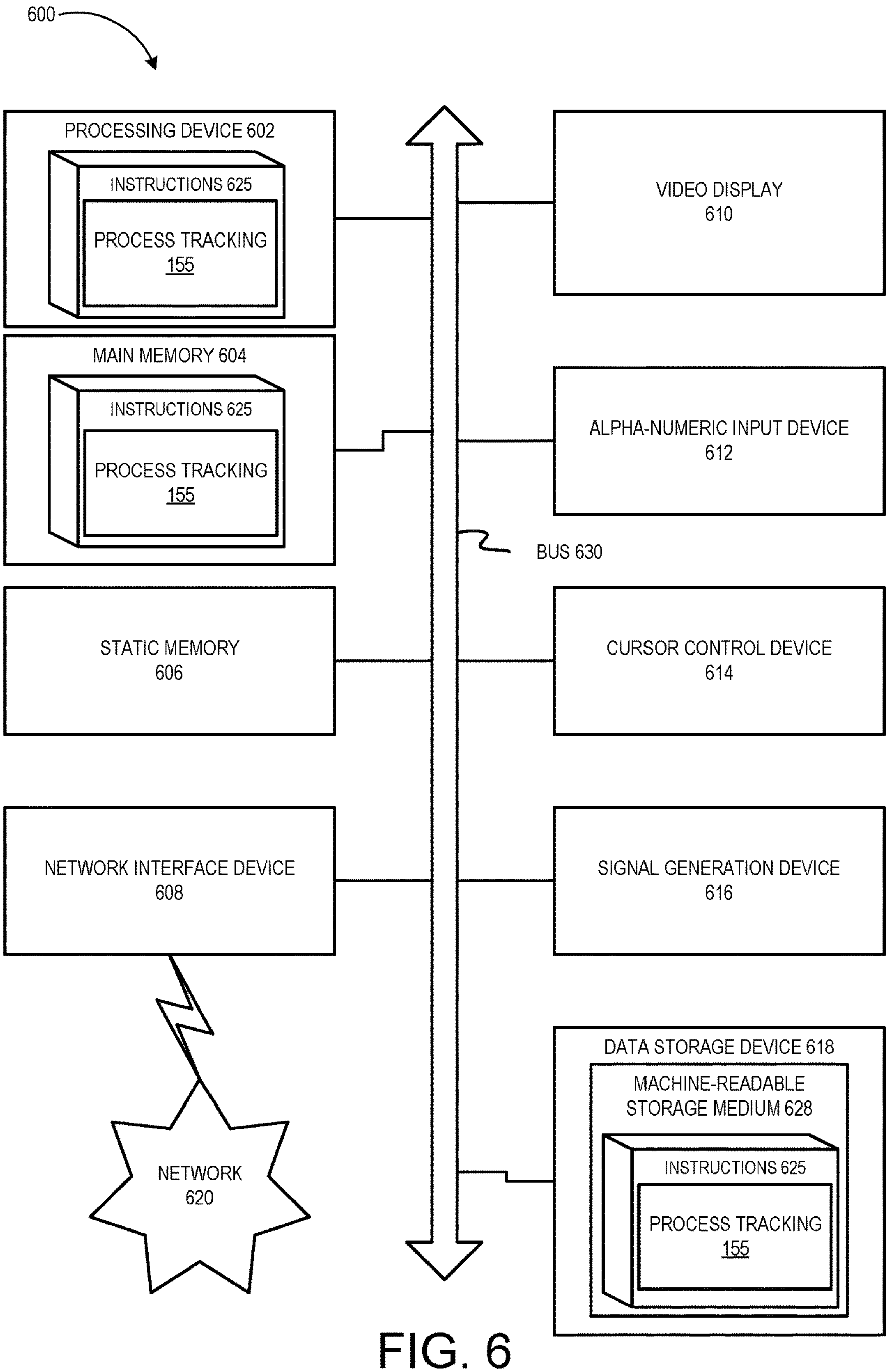
FIG. 6 is a block diagram of an example computing device that may perform one or more of the operations described herein, in accordance with embodiments of the disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general-purpose processor, a PLD, etc.) 602, a main memory 604 (e.g., synchronous dynamic random-access memory (DRAM), read-only memory (ROM)), a static memory 606 (e.g., flash memory) and a data storage device 618, which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a tracking process activity, e.g., process tracking engine 155, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "detecting," "determining," "generating," "associating," "tracking," "transmitting," "setting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:

detecting, in a kernel space of an operating system executing on a computing device, a creation of a first process;

determining, by a processing device, an exec parent of the first process, the exec parent identifying a second process, within an ancestry of the first process, that last performed an exec operation, prior to the creation of the first process, the exec operation comprising a system call that replaces at least a portion of an instruction space of the second process while maintaining the identity of the second process, and wherein the exec parent is a nearest ancestor that has performed the system call prior to the creation of the first process;

generating a unique process identifier (UPID) associated with a process identifier (PID) of the first process;

associating the UPID with the exec parent in a first mapping store that maps the PID to the UPID; and tracking process activity of the first process executing in the operating system to generate process activity data that comprises the exec parent.

2. The method of claim 1, wherein the second process is a different process from a third process that created the first process.

3. The method of claim 1, wherein the exec operation performed by the second process is a first exec operation, and wherein generating the UPID associated with the PID of the first process is performed responsive to at least one of detecting the first process performing a second exec operation, detecting a network operation by the first process, or detecting access of a storage device by the first process.

4. The method of claim 1, wherein the UPID is a first UPID, and wherein the exec parent of the first process comprises a second UPID of the second process.

5. The method of claim 1, wherein the exec parent is determined by an application extension executing in an extended Berkeley packet filter (eBPF) infrastructure within the operating system of the computing device.

6. The method of claim 1, further comprising transmitting a message comprising the PID to a message buffer structure.

7. The method of claim 1, wherein the exec parent of the first process is a first exec parent, and wherein determining the first exec parent of the first process comprises:

responsive to determining that a parent process of the first process has performed the exec operation prior to creating the first process, setting the first exec parent of the first process to a value associated with the parent process of the first process; or responsive to determining that the parent process of the first process has not performed the exec operation prior to creating the first process, setting the first exec parent of the first process to a second exec parent of the parent process of the first process.

8. A system comprising:

a memory; and a processing device, operatively coupled to the memory, to:

detect, in a kernel space of an operating system executing on a computing device, a creation of a first process;

determine an exec parent of the first process, the exec parent identifying a second process, within an ancestry of the first process, that last performed an exec operation, prior to the creation of the first process, the exec operation comprising a system call that replaces at least a portion of an instruction space of the second process while maintaining the identity of the second process, and wherein the exec parent is a nearest ancestor that has performed the system call prior to the creation of the first process;

generate a unique process identifier (UPID) associated with a process identifier (PID) of the first process;

associate the UPID with the exec parent in a first mapping store that maps the PID to the UPID; and track process activity of the first process executing in the operating system to generate process activity data that comprises the exec parent.

9. The system of claim 8, wherein the second process is a different process from a third process that created the first process.

10. The system of claim 8, wherein the exec operation performed by the second process is a first exec operation, and wherein the processing device is to generate the UPID associated with the PID of the first process responsive to at least one of detecting the first process performing a second exec operation, detecting a network operation by the first process, or detecting access of a storage device by the first process.

11. The system of claim 8, wherein the UPID is a first UPID, and wherein the exec parent of the first process comprises a second UPID of the second process.

12. The system of claim 8, wherein the exec parent is determined by an application extension executing in an extended Berkeley packet filter (eBPF) infrastructure within the operating system of the computing device.

13. The system of claim 8, wherein the processing device is further to transmit a message comprising the PID to a message buffer structure.

14. The system of claim 8, wherein the exec parent of the first process is a first exec parent, and wherein, to determine the first exec parent of the first process, the processing device is further to:

responsive to determining that a parent process of the first process has performed the exec operation prior to creating the first process, set the first exec parent of the first process to a value associated with the parent process of the first process; or responsive to determining that the parent process of the first process has not performed the exec operation prior to creating the first process, set the first exec parent of the first process to a second exec parent of the parent process of the first process.

15. A non-transitory computer-readable storage medium including instructions that, when executed by a processing device, cause the processing device to:

detect, in a kernel space of an operating system executing on a computing device, a creation of a first process;

determine, by the processing device, an exec parent of the first process, the exec parent identifying a second process, within an ancestry of the first process, that last performed an exec operation, prior to the creation of the first process, the exec operation comprising a system call that replaces at least a portion of an instruction space of the second process while maintaining the identity of the second process, and wherein the exec parent is a nearest ancestor that has performed the system call prior to the creation of the first process;

generate a unique process identifier (UPID) associated with a process identifier (PID) of the first process;

associate the UPID with the exec parent in a first mapping store that maps the PID to the UPID; and track process activity of the first process executing in the operating system to generate process activity data that comprises the exec parent.

16. The non-transitory computer-readable storage medium of claim 15, wherein the exec operation performed by the second process is a first exec operation, and wherein the processing device is to generate the UPID associated with the PID of the first process responsive to at least one of detecting the first process performing a second exec operation, detecting a network operation by the first process, or detecting access of a storage device by the first process.

17. The non-transitory computer-readable storage medium of claim 15, wherein the UPID is a first UPID, and wherein the exec parent of the first process comprises a second UPID of the second process.

18. The non-transitory computer-readable storage medium of claim 15, wherein the exec parent is determined by an application extension executing in an extended Berkeley packet filter (eBPF) infrastructure within the operating system of the computing device.

19. The non-transitory computer-readable storage medium of claim 15, wherein the processing device is further to transmit a message comprising the PID to a message buffer structure.

20. The non-transitory computer-readable storage medium of claim 15, wherein the exec parent of the first process is a first exec parent, and wherein, to determine the first exec parent of the first process, the processing device is further to:

responsive to determining that a parent process of the first process has performed the exec operation prior to creating the first process, set the first exec parent of the first process to a value associated with the parent process of the first process; or responsive to determining that the parent process of the first process has not performed the exec operation prior to creating the first process, set the first exec parent of the first process to a second exec parent of the parent process of the first process.

* * * * *